July 28, 1953     J. M. ADLER     2,646,843
PROTECTIVE COVER FOR BABY CARRIAGE CONTENTS
Filed April 14, 1951     2 Sheets-Sheet 2
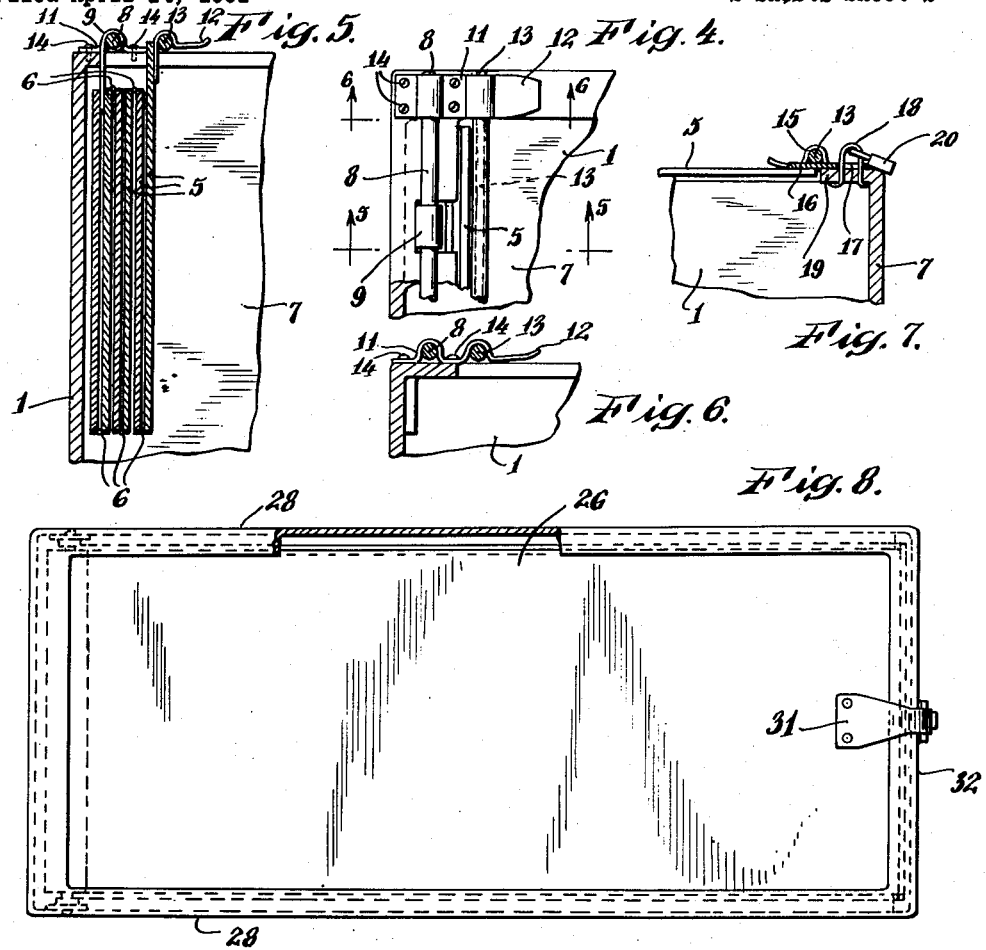
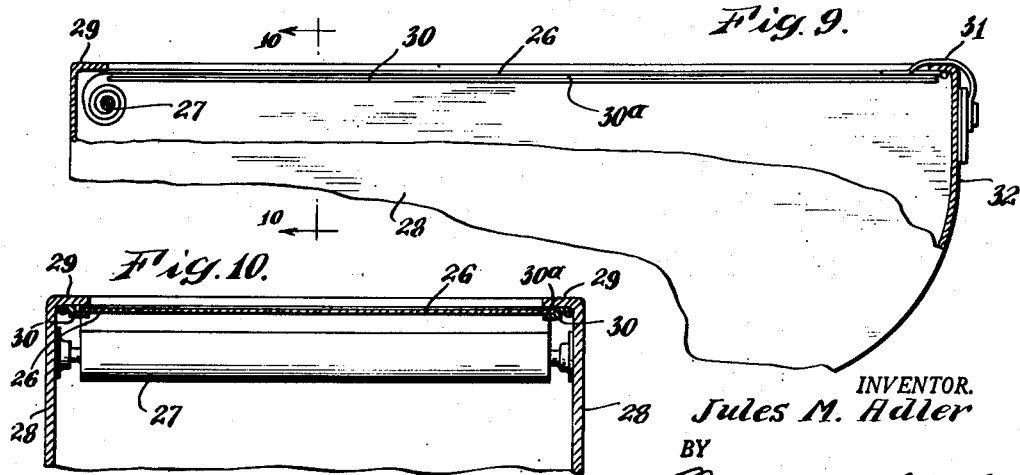
INVENTOR.
Jules M. Adler
BY
Fraser, Myers & Manley
ATTORNEYS.

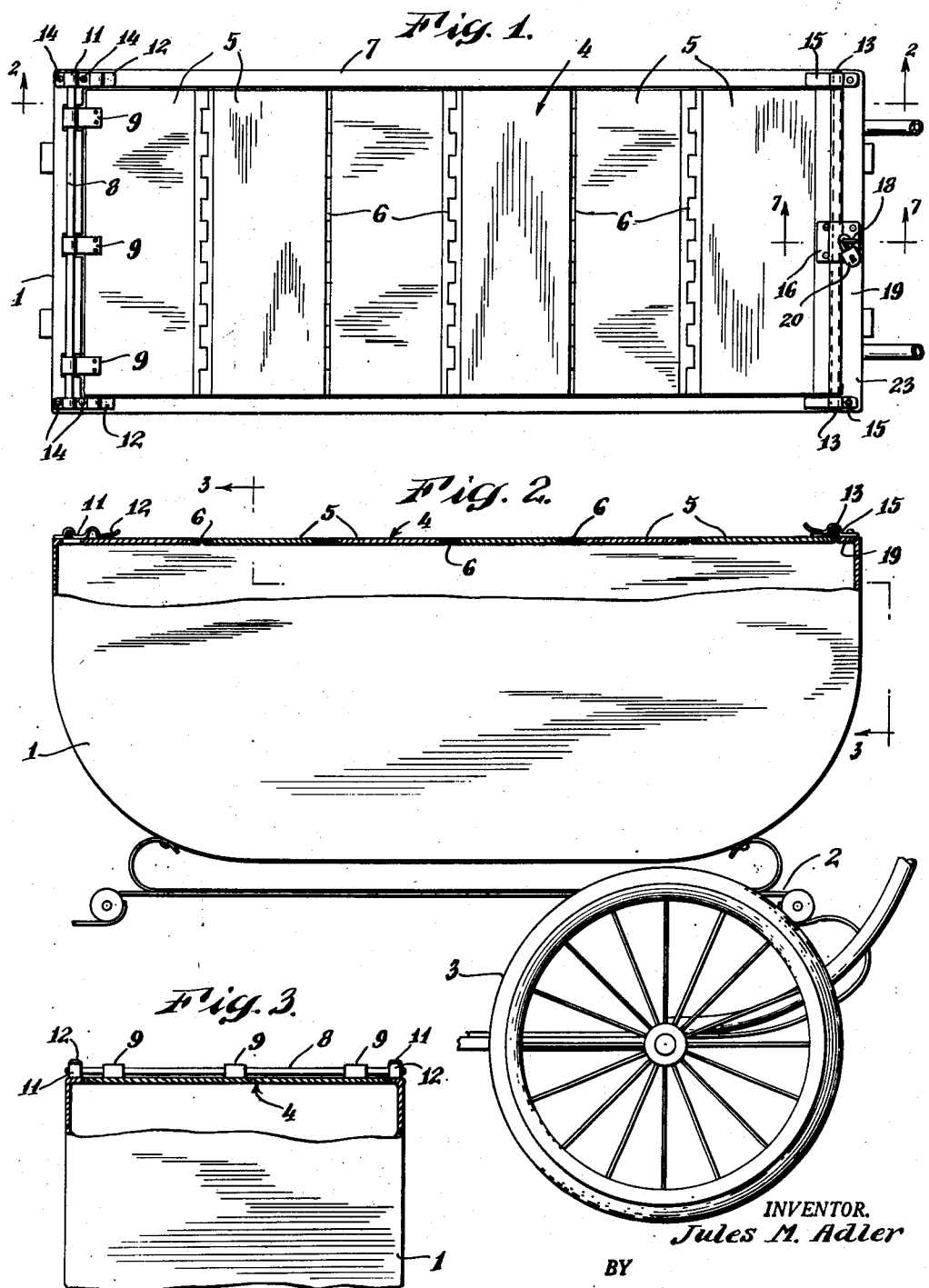

Patented July 28, 1953

2,646,843

UNITED STATES PATENT OFFICE 2,646,843

PROTECTIVE COVER FOR BABY CARRIAGE CONTENTS

Jules M. Adler, Yonkers, N. Y.

Application April 14, 1951, Serial No. 221,088

4 Claims. (Cl. 160—127)

This invention relates to protective means for safeguarding the contents of baby carriages.

It frequently happens, particularly in congested urban areas, that baby carriages must be stored in places relatively remote from the dwelling place of the owner. For example, it is common practice in apartment houses and developments on the community plan, to require the tenants or lessees to store such articles as baby carriages in a basement, a storeroom or other suitable place provided for the purpose. As a concomitant result of such practice, the contents of the carriages are subject to pilferage by sneak thieves, and occasionally, stray cats or dogs find that the open carriage provides a convenient bed, whereupon the bedding materials become unfit for human use.

To obviate the aforementioned drawbacks, it is the object of the present invention to provide a protective cover for baby carriages which will maintain the contents inviolate from sneak thieves and stray cats and dogs.

The realization of the aforementioned object and other objects not specifically enumerated will become apparent from the following description, when considered in conjunction with the accompanying drawings, wherein:

Figure 1 is a plan view of a baby carriage disclosing one embodiment of my invention.

Fig. 2 is an elevational view of the device shown in Fig. 1.

Fig. 3 is a sectional view taken along the line 3—3 of Fig. 2.

Fig. 4 is a partial plan view on an enlarged scale showing the protective cover of Fig. 1 in the folded or inoperative position.

Fig. 5 is a sectional view taken along the line 5—5 of Fig. 4.

Fig. 6 is a sectional view taken along the line 6—6 of Fig. 4.

Fig. 7 is a sectional view taken along the line 7—7 of Fig. 1.

Fig. 8 is a plan view showing another embodiment of my invention.

Fig. 9 is a fractional elevational view of Fig. 8.

Fig. 10 is a sectional view taken along the line 10—10 of Fig. 9.

In Figs. 1 to 7 there is shown a baby carriage having a body 1 mounted on a spring chassis frame 2 and having conventional wheels 3. In the interest of clarity, the usual carriage hood, located at either end of the body, has been omitted. The protective cover 4 comprises a plurality of panels 5 of suitable material joined together by any desired hinging means 6 so that the whole series of panels may be folded in accordion fashion when not in use. The width of the cover 4 is slightly less than the inside dimension of the carriage body measured across the side walls 7, in order to facilitate the quick and ready positioning of the protective cover in either the extended and locked position shown in Fig. 1 or the collapsed or out of use position shown in Figs. 4 and 5. It will be appreciated, of course, that the clearance between the side walls 7 and the edges of the cover 4 when extended is not of sufficient magnitude to enable the hand of a person to be inserted or forced therebetween or to permit the withdrawal of the contents of the carriage body. At the left hand end of the cover 4 a number of fasteners 9 are secured thereto, each fastener having an end portion formed with an eye to accommodate a supporting rod 8 inserted therethrough. The ends of the rod 8 extend beyond the inner side walls of the body and are supported by cleats 11 which are mounted on the top of the carriage side walls 7. Each cleat has an extended end portion formed as a spring clip 12 which resiliently presses against the top of a side wall 7 to yieldingly accommodate the ends of a rod 13 carried by the cover at the opposite or right hand end thereof as viewed in the drawings, so that when the protective cover is not in use it may be collapsed and held by the spring clip 12, as shown in Figs. 4 and 5. The cleats 11 may be secured to the side walls 7 by any suitable means such as screws 14.

The cover when unfolded or extended is of a length substantially equal to the length of the carriage body at its top and the rod 13 is of a length to overlie the top side walls of the body. In a manner similar to that employed at the left hand end, cleats 15 are provided for yieldingly engaging the exposed end portions of rod 13 when the cover is in fully extended position. At the middle of the free end of the cover 4 it is provided with a hasp 16 having an aperture 17 for receiving a staple 18 mounted on the top of the end rail 19 of the body, through which staple the shackle of a padlock 20 may engage to lock the cover in overlying relation to the interior of the carriage body.

In the embodiment of my invention shown in Figs. 8, 9 and 10, a roller type protective cover is utilized. As best seen in Figs. 9 and 10, a protective cover 26 is carried by a spring roller 27 in the manner of the well known window shade, the spring roller 27 being mounted on suitable supports located on the inner surfaces of side walls 28 of the carriage body. The cover 26 may be of any strong material that reasonably lends itself to being rolled up on the spring roller 27. In order that the protective cover 26 be completely tamper-proof, it is made to ride on tracks located lengthwise on the inner under side of side walls 28, as will be presently explained. Z-members 30 are secured to the underside of flanges 29 on the side walls 28, to provide tracks or grooves 30a within which the lateral edges of the cover 26 may ride. The free end of the cover has attached thereto a strap 31 provided with means for locking it to the end wall 32 in any desired manner.

From the foregoing detailed description it will be apparent that the protective cover when not in use is housed in the body of the carriage out of view and by virtue of its size will detract but little from the usable space of the carriage body. Moreover, the protective cover may be incorporated in new carriages as original equipment or it may be made as an accessory for attachment to old carriages.

While I have shown and described two embodiments of my invention it is to be understood that changes in constructional details may be resorted to within the range of engineering and mechanical skill without departing from the spirit of the invention as hereinafter claimed.

What I claim is:

1. In combination, a baby carriage body having an open top and a protective cover for safeguarding the contents in such carriage body, said cover comprising a plurality of panels hingedly joined together to fold in accordion fashion, cooperating means at one end of the carriage body and on one end panel for pivotally mounting said end panel to dependingly suspend said panel, supplemental means on the carriage body in close proximity to the first mentioned means on the carriage body to hold the other end panel suspended in substantially parallel relation to said first end panel when the panels are collapsed in accordion fashion, and means at the opposite end of the carriage body for engaging and holding said other end panel when the panels are fully extended.

2. The combination according to claim 1 wherein the other end panel carries a transverse rod which projects beyond the lateral edges of the panel and the means for holding said other end panel when the cover is in collapsed condition comprising spring clips under which the extending ends of the rods are adapted to engage and be held.

3. The combination according to claim 1 wherein the other end panel and the carriage body have cooperating means whereby the cover, when in extended relation to cover the open top of the body, may be locked in said relation.

4. The combination according to claim 1 wherein the panels are of a width to fit within the open top of the carriage body and the means for dependingly holding the end panels when the protective cover is collapsed are disposed inwardly adjacent one end of the carriage body to hold said collapsed cover within the body adjacent an end wall thereof.

JULES M. ADLER.

References Cited in the file of this patent

UNITED STATES PATENTS

| Number | Name | Date |
|---|---|---|
| 597,402 | Duchemin | Jan. 18, 1898 |
| 834,287 | Frey | Oct. 30, 1906 |
| 1,126,236 | Lees | Jan. 26, 1915 |
| 1,843,340 | Satake | Feb. 2, 1932 |
| 2,191,005 | Wylie | Feb. 20, 1940 |
| 2,546,843 | Zigterman | Mar. 27, 1951 |